US007617908B2

(12) United States Patent
Chang et al.

(10) Patent No.: US 7,617,908 B2
(45) Date of Patent: Nov. 17, 2009

(54) DOWNHOLE SEISMIC SOURCE

(75) Inventors: Chung Chang, Lexington, MA (US);
Richard Timothy Coates, Middlebury, CT (US); Jean G. Saint Germain, Cambridge, MA (US)

(73) Assignee: Schlumberger Technology Corporation, Ridgefield, CT (US)

( * ) Notice: Subject to any disclaimer, the term of this patent is extended or adjusted under 35 U.S.C. 154(b) by 449 days.

(21) Appl. No.: 11/559,252

(22) Filed: Nov. 13, 2006

(65) Prior Publication Data
US 2008/0110691 A1 May 15, 2008

(51) Int. Cl.
*G01V 1/02* (2006.01)

(52) U.S. Cl. ............... 181/121; 181/106; 181/108; 181/113; 367/25; 166/249; 166/254.2; 166/209; 166/210; 166/211

(58) Field of Classification Search .......... 181/106, 181/108, 113, 121; 367/25; 166/249, 254.2, 166/118, 209, 210, 211
See application file for complete search history.

(56) References Cited

U.S. PATENT DOCUMENTS

| | | | | |
|---|---|---|---|---|
| 3,716,111 | A * | 2/1973 | Lavergne | 181/113 |
| 4,118,994 | A * | 10/1978 | Layotte et al. | 74/61 |
| 4,205,731 | A * | 6/1980 | Cholet et al. | 181/114 |
| 4,402,381 | A * | 9/1983 | Airhart | 181/114 |
| 4,505,363 | A | 3/1985 | Herbulot et al. | |
| 4,564,083 | A * | 1/1986 | Layotte et al. | 181/114 |
| 4,609,066 | A * | 9/1986 | Layotte et al. | 181/121 |
| 4,651,044 | A | 3/1987 | Kompanek | |
| 4,850,451 | A * | 7/1989 | Cholet et al. | 181/114 |
| 5,080,189 | A * | 1/1992 | Cole | 181/106 |
| 5,228,011 | A | 7/1993 | Owen | |
| 5,400,640 | A * | 3/1995 | Stuckey | 73/12.14 |
| 5,515,918 | A * | 5/1996 | Brett et al. | 166/249 |
| 6,550,534 | B2 * | 4/2003 | Brett | 166/65.1 |
| 6,619,423 | B2 * | 9/2003 | Courage | 181/108 |
| 2003/0205428 | A1* | 11/2003 | Chang | 181/108 |
| 2005/0087391 | A1* | 4/2005 | Ounadjela | 181/121 |
| 2006/0118353 | A1* | 6/2006 | Quinn et al. | 181/121 |

OTHER PUBLICATIONS

Kennedy et al., A Swept-Frequency Borehole Source for Inverse VSP and Cross-Borehole Surveying, 7th Geophysical conference of the Australian Society of Exploration Geophysics, 1989, vol. 20, pp. 133-136.

(Continued)

*Primary Examiner*—Jeffrey Donels
*Assistant Examiner*—Jeremy Luks
(74) *Attorney, Agent, or Firm*—Helene Raybaud; James McAleenan; Jody Lynn DeStafanis

(57) ABSTRACT

Elastodynamic waves are generated by a tool having a hammer rotatably connected with a housing by a first hinge and an actuator arm rotatably connected with the hammer by a second hinge. An axial force applied to the actuator arm by a drive shaft and spring is translated and amplified to a radial impact force by rotation of the hammer around the first hinge. The tool may also include a stabilizer arm connected to the actuator arm by a third hinge, and connected to the housing by a fourth hinge. The housing may be an acoustic wireline tool cylinder having an opening that permits the hammer mass to extend outside the housing when rotated in a first direction. The housing may also include a second opening that permits the hammer mass to extend outside the housing when rotated in a second direction, and a third opening that permits the hammer mass to extend outside the housing when rotated between the first and second openings.

20 Claims, 3 Drawing Sheets

OTHER PUBLICATIONS

Balogh et al., New Piezoelectric transducer for Hole-to-Hole Seismic Applications, 58th Annual International Meeting of the Society of Exploration Geophysics, 1988, Session DEV 2.5, pp. 155-157.

Owen et al., Arc Discharge Pulse Source for Borehole Seismic Applications, 58th Annual International Meeting of the Society of Exploration Geophysics, 1988, Session DEV 2.4, pp. 151-154.

Cutler, Development of a Hydraulic Borehole Seismic Source, Sandia report SAND98-0932, UC-902, Apr. 1998, pp. i-vi, 1-97.

Ziolkowski et al., Determination of tube-wave to body-wave ration for Conoco borehole orbital source, 69th Annual International Meeting of the Society of Exploration Geophysics, 1999, pp. 156-159.

Kennedy, et al., Swept-Frequency Borehole source for Inverse VSP and Cross-Borehole Surveying, 58th Annual International Meeting of the Society of Exploration Geophysics, Expanded Abstracts, 1988, DEV 2.6, pp. 158-160.

* cited by examiner

DOWNHOLE SEISMIC SOURCE

FIELD OF THE INVENTION

This invention relates generally to subterranean borehole technology, and more particularly to seismic analysis of formations proximate to boreholes.

BACKGROUND OF THE INVENTION

Seismic analysis of subterranean formations is a mature technology. Elastodynamic waves generated by a seismic source at a known location are measured with arrays of sensors. Based on the measurements, it is possible to detect, for example, the presence of fractures, stresses, and sedimentation boundaries in the formation. Preferably, the seismic source is relatively powerful because it is sometimes desirable to obtain measurements at distant sensors, and elastodynamic waves at certain frequencies are rapidly attenuated in the subterranean environment. Higher frequency elastodynamic waves are generally attenuated more rapidly than lower frequency elastodynamic waves. The seismic source should preferably be adjustable because different types of elastodynamic waves and different frequencies of elastodynamic waves are useful for different types of measurements. The seismic source should preferably be consistent because variations in measurements due to inconsistent source waves complicates analysis.

Known types of seismic sources include explosive charges, perforation charges, air guns, implosive bottles, orbital vibrators, axial vibrators, pneumatic shakers, PZT shakers, tube wave reflector/converters, axial spring-loaded hammer/anvil, and EM actuated hammer/anvil. These seismic sources can be divided into two categories: (1) sources which introduce acoustic waves into the borehole fluid; and (2) sources which are clamped against the borehole wall. All of the known seismic sources have some limitations. For example, simply introducing energy into the borehole fluid has limited efficiency in exciting waves in the formation because of the relatively high acoustic impedance between the fluids and the formation. The impedance causes most of the energy to be reflected back toward the borehole. Much of the energy introduced into the borehole fluid generates tube waves that propagate only within the borehole. Less energy is trapped in the tube wave when the excitation is caused by an impact on the borehole wall. The adjustability of explosive charges is also limited because a relatively wide and uncontrollable spectrum of frequencies is generated by an explosive charge. Further, obtaining consistency between explosive charges may require great precision in manufacturing, and therefore be impractical. Explosive charges also require time consuming preparations between tests, including placement of a new charge. In other words, it is not practical to detonate explosive charges in succession because a charge is likely to damage or ignite any nearby charges that would be used for subsequent firing. It would therefore be desirable to have an improved seismic source.

SUMMARY OF THE INVENTION

In accordance with one embodiment of the invention, apparatus for facilitating generation of elastodynamic waves comprises: a body; a hammer having a shaft and a mass, the shaft being connected with the body by a first hinge; and an actuator arm connected with the hammer by a second hinge, whereby an axial force applied to the actuator arm is translated and amplified to a radial impact force by rotation of the hammer around the first hinge to strike a borehole wall.

In accordance with another embodiment of the invention, a method for facilitating generation of elastodynamic waves comprises: inserting into a borehole a tool including: a body; a hammer having a shaft and a mass, the shaft being connected with the body by a first hinge; and an actuator arm connected with the hammer by a second hinge; and applying an axial force to the actuator arm, the axial force being translated and amplified to a radial impact force by rotation of the hammer around the first hinge, resulting in contact between the mass and a portion of the borehole, thereby causing formation of elastodynamic waves.

One of the advantages of the invention is that a relatively concentrated radial force is created from an axial force by virtue of the hammer rotating around the hinge. It is relatively easy to provide an axial force in the borehole environment because the available working volume in the axial direction is relatively large. Therefore, the originating force can be produced in a simple and inexpensive manner. Further, by virtue of contact occurring in a radial direction, relatively little energy is directed along undesired vectors. As a result, little energy is wasted, and most of the available energy can be directed along a vector of interest.

Other advantages of the invention are reliability and repeatability. With relatively few moving parts and simple hinges and bearings the tool is suitable for the harsh borehole environment. Because technology to accurately control the application of the axial force is readily available, the tool can be made to consistently apply a given radial impact force against the casing and borehole wall. For example, it is possible to accurately control the compression of a spring that is utilized as the source for the axial force. As a result, the strength of the elastodynamic waves will be consistent. This is useful when it is desired to observe some other variable.

DETAILED DESCRIPTION

Figure 1:
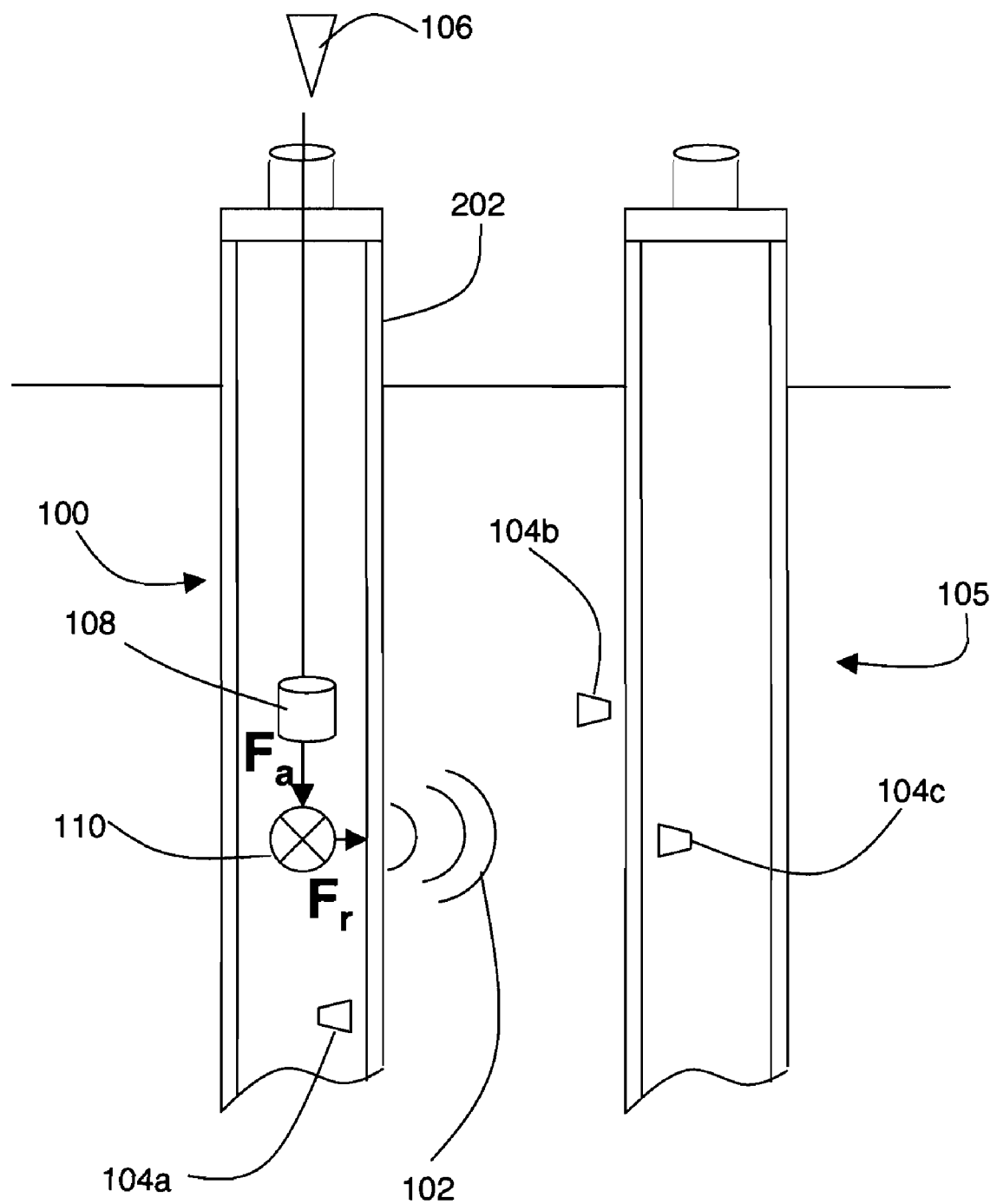
FIG. 1 schematically illustrates a seismic source which includes an axial to radial force translator and amplifier.

FIG. 1 illustrates a schematic representation of a downhole seismic source for facilitating data collection. The seismic source is utilized in a borehole (100) and is operable to produce elastodynamic waves (102) which can be measured by sensors (104a-104c). In particular, P, S, SH, and SV type waves can be generated. The sensors may be located within the borehole itself, e.g., sensor (104a), in a nearby borehole (105), e.g., sensor (104c), and in the formation proximate to the borehole, e.g., sensor (104b). Based on the measurements obtained by the sensors, it is possible to detect, for example, the presence of fractures, stresses, and sedimentation boundaries in the formation. Detection of such conditions can be utilized to enhance recovery of oil and gas.

The seismic source includes an energy source component (106), an energy storage component (108), and a force translator and amplification component (110). The energy source component (106) may be located either above or below the surface, as desired. The energy source component is operable to provide energy which is accumulated by the energy storage component. The energy may be provided and stored in any practical form, including but not limited to electrical, electromagnetic, chemical and mechanical. When actuated, the energy storage component (108) is operable to release the stored energy over a relatively brief time interval in the form of an axial force $F_a$. The axial force is directed along an axis which is parallel with an axis defined by the borehole. Since some boreholes deviate from vertical, the axial force may be at any of various inclinations with respect to the surface. The translator and amplification component (110) is operable in response to the axial force to produce a radial force $F_r$, i.e., to translate and amplify the axial force to a radial impact force. The radial force is directed along an axis which is orthogonal with the axis defined by the borehole. Application of the radial force to the borehole wall results in production of elastodynamic waves (102) in the formation.

Figure 2:
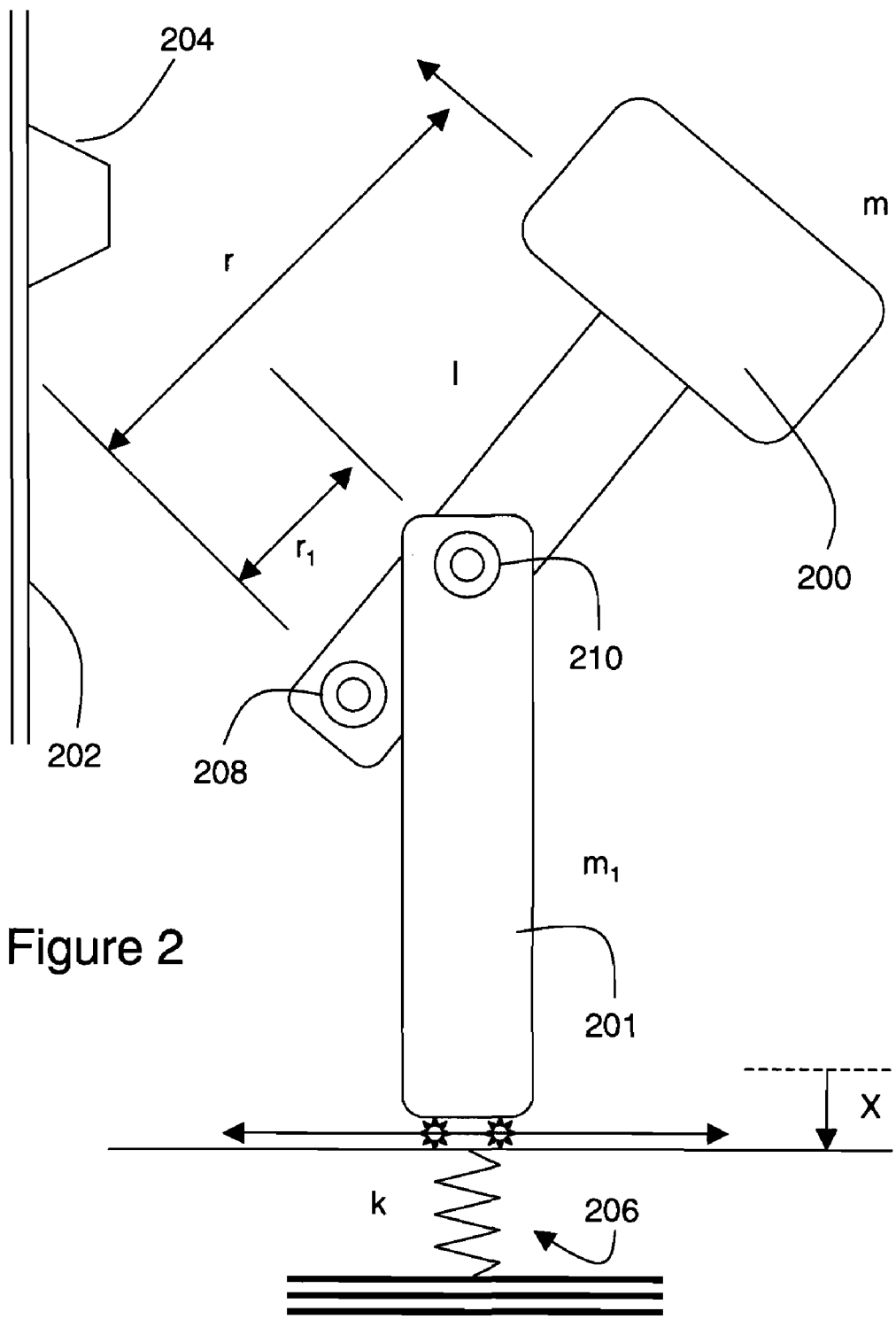
FIG. 2 illustrates a model of the seismic source of FIG. 1.

FIG. 2 illustrates a model of one embodiment of the seismic source of FIG. 1. In this embodiment, the radial force is generated by the impact of a rotating mass ("hammer") (200) against the casing (202) and borehole wall, e.g., against the casing of the completion, or against an anvil (204) pressed against the casing. The impact force can be modeled by Hertzian Contact Theory, which predicts contact time and maximum force of the impact between a curved object and an elastic half space. In particular, $$\tfrac{1}{2}kx^2 = \tfrac{1}{2}I(^v/_r)^2 + \tfrac{1}{2}m_1(V^{*r1}/_r)^2, \qquad (1)$$

where:

I is the moment of inertia of the hammer head and arm (200);

$m_1$ is the mass of the actuator shaft (201);

k is the spring constant of spring (206);

x is the deflection; and $r_1$ and r are radii of rotation.

From V and m it is possible to calculate the contact time (T) and impact force (f). In particular:

$$\text{contact time } T = KV_0^{1/5}, \qquad (2)$$

where $k = 2.94(^{15}/_{16}mq)^{2/5}R^{-1/5}$ and $q = \{^{(1-v^2)}/_E + (1-v_b^2)/E_b\}$ and $$\text{peak force } f = -(\tfrac{4}{3}q)R^{1/2}Z_0^{3/2}, \qquad (3)$$

where $Z_0 = \{^{15}/_{16}mq\}^{2/5}R^{-1/5}V_0^{4/5}$.

The impact force and contact time of the hammer before striking the borehole wall (or anvil) are calculable from speed and mass.

Using the calculations above, in one embodiment a useful device capable of operation within the confines of a standard casing has a steel head hammer of 1.5 pounds with a radius of curvature of 1.75 inches. The arm length from the center of gravity of the hammer to the hinge (208) is 2.173 inches, and the distance between the two hinges (208, 210) is 1.25 inches. The spring constant k is 1347 N/cm and the compression distance is 6.096 cm. The actuator arm has a weight $m_1$ of 0.116 pounds. Using the dynamic analytical model and Hertzian contact theory, the hammer speed is calculated to be about 26 m/s before impact, and the contact time is 1.2 ms, resulting in a peak force of about 110,000 pounds. It is noted that these dimensions and masses are provided as examples of one useful embodiment; other dimensions and masses may be suitably employed.

Figure 3:
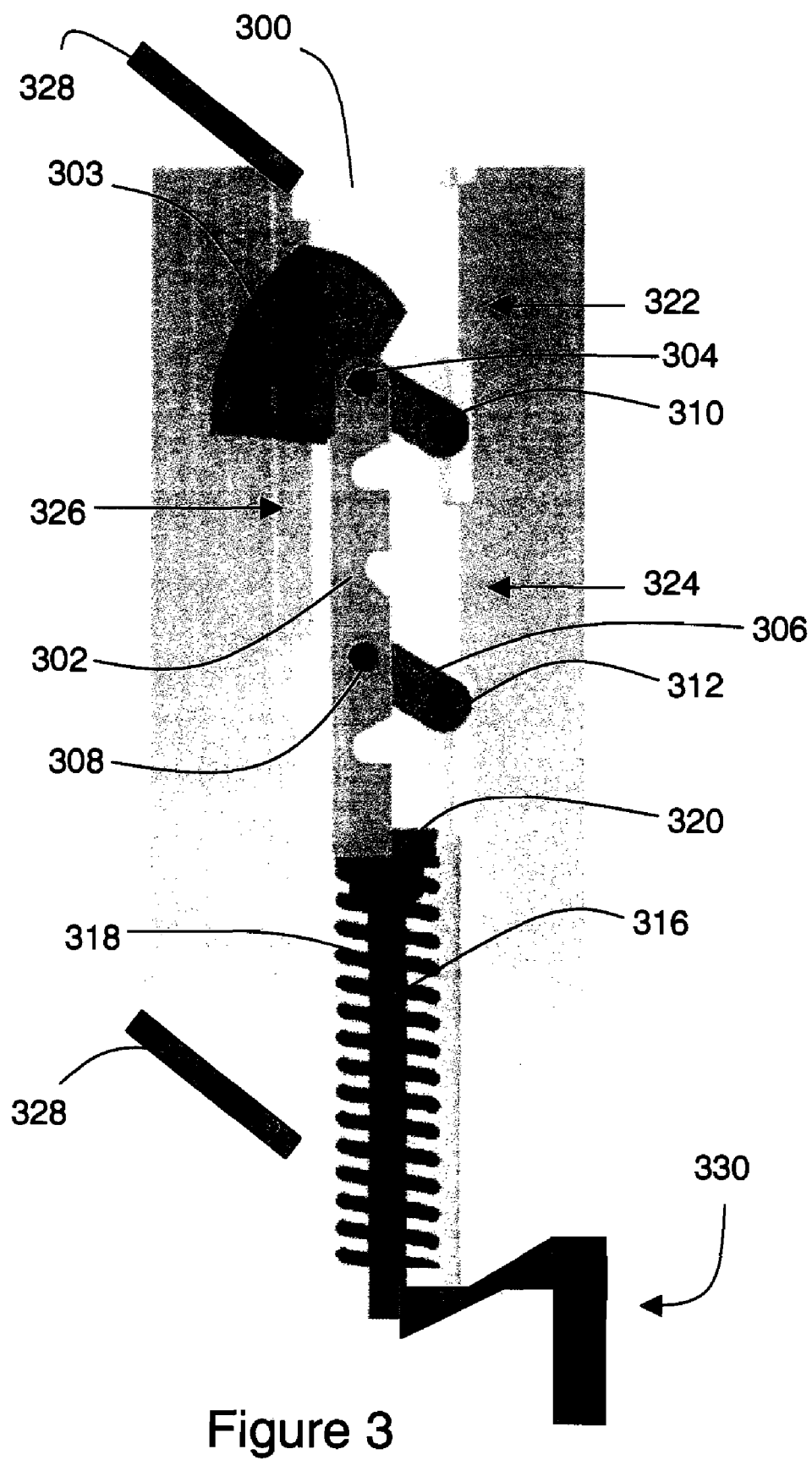
FIG. 3 illustrates one specific embodiment of the seismic source of FIG. 1.

Referring now to FIG. 3, an embodiment of the tool is adapted for use with a standard 2.5 inch diameter acoustic wireline housing (300). In this embodiment the actuator arm (302) is attached to the hammer (303) at hinge (304), and also to a stabilizer arm (306) at a hinge (308). The hammer rotates about a second hinge (310) that is secured to the tool housing (300). The stabilizer arm (306) also rotates about a hinge (312) that is secured to the tool housing. The distance between hinges (308, 312) on the stabilizer arm is equal to the distance between hinges (304, 310) on the actuator arm (314). Consequently, the actuator arm remains oriented parallel with the length of the tool housing during operation. A shaft (316) which operates under axial force from a spring (318) is operably connected with the actuator arm. In particular, a lubricated contact surface (320) provides a bearing so that the actuator arm can move relative to the contact surface during operation. Wheels or ball bearings could alternatively be used, but may be more susceptible to wear and failure in the borehole environment.

In order to accommodate a relatively complete range of motion of the hammer, the tool housing (300) has two openings (322, 324) on the contact side and one larger opening (326) on the back side. The furthest opening (322) permits the hammer head (303) to extend out of the tool housing in order to contact the casing, i.e., to generate elastodynamic waves. The nearer contact-side opening (324) permits the backside of the hammer to extend out of the tool housing in preparation for a wave-generating swing. By extending the backswing of the hammer, it is possible to utilize a greater range of compression of the spring (318). The far side opening (326) in the tool housing permits the hammer to swing around without interference by the tool housing.

One or more position-stabilizer arms (328) may be used to help maintain the position of the tool relative to the borehole during use. Each position-stabilizer arm may be attached to the housing (300) by a hinge. When actuated, the position-stabilizer arm pivots around the hinge such that a distal end of the arm contacts the borehole wall and forces the housing against the opposite side of the borehole wall. Although the position-stabilizer arms are illustrated as extending away from the housing on the side opposite to the side at which the hammer head extends at impact, the position-stabilizer anus could alternatively extend away from the housing on the same side as the hammer head extends at impact.

Referring to FIGS. 1 and 3, the tool can be repeatedly rearmed and actuated with relatively little preparation, and without first being withdrawn from the borehole. The shaft (316) is equipped with a latch and trigger mechanism (330). An energy source at the surface or within the borehole is utilized to move the shaft (316), and thereby compress the spring (318) until the latch is engaged, i.e., the tool is rearmed. The latch maintains the spring in compression until released by the trigger. Consequently, the period between successive activations of the tool in a given position is a function of the time required to compress the spring.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. A method for facilitating generation of elastodynamic waves comprising:

inserting into a borehole a tool including: a body; a hammer having a shaft and a mass, the shaft being connected with the body by a first hinge; and an actuator arm connected with the hammer by a second hinge; and applying an axial force to the actuator arm, the axial force being translated and amplified to a radial impact force by rotation of the hammer around the first hinge, resulting in contact between the mass and a portion of the borehole, thereby causing formation of elastodynamic waves.

2. The method of claim 1 including the step of applying the axial force to the actuator arm via an axial drive shaft operably connected with the actuator arm at a bearing surface.

3. The method of claim 2 including the step of applying the axial force to the actuator arm via a spring operably connected with the axial drive shaft.

4. The method of claim 1 further including a stabilizer connected to the actuator arm by a third hinge, and connected to the body by a fourth hinge.

5. The method of claim 1 wherein the body includes a cylindrical housing.

6. The method of claim 5 wherein the housing includes a first opening that permits the hammer mass to extend outside the housing when rotated in a first direction.

7. The method of claim 6 wherein the housing includes a second opening that permits the hammer mass to extend outside the housing when rotated in a second direction.

8. The method of claim 7 wherein the housing includes a third opening that permits the hammer mass to extend outside the housing when rotated between the first and second openings.

9. The method of claim 1 wherein the mass is approximately 1.5 pounds, the mass is characterized by a radius of curvature of 1.75 inches, the hammer is characterized by an arm length from center of gravity to the first hinge of 2.173 inches and first and second hinges are at a distance of 1.25 inches from each other.

10. The method of claim 3 wherein the spring is characterized by a spring constant k of approximately 1347 N/cm and the spring is characterized by a compression distance of approximately 6.096 cm.

11. A borehole tool for facilitating generation of elastodynamic waves within a subterranean formation comprising:
   a body;
   a hammer having a shaft and a mass, the shaft being connected with the body by a first hinge; and
   an actuator arm connected with the hammer by a second hinge, whereby an axial force applied to the actuator arm is translated and amplified to a radial impact force by rotation of the hammer around the first hinge.

12. The borehole tool of claim 11 further including an axial drive shaft operably connected with the actuator arm at a bearing surface.

13. The borehole tool of claim 12 further including a spring operably connected with the axial drive shaft to generate an axial force.

14. The borehole tool of claim 11 further including a stabilizer connected to the actuator arm by a third hinge, and connected to the body by a fourth hinge.

15. The borehole tool of claim 11 wherein the body includes a cylindrical housing.

16. The borehole tool of claim 15 wherein the housing includes a first opening that permits the hammer mass to extend outside the housing when rotated in a first direction.

17. The borehole tool of claim 16 wherein the housing includes a second opening that permits the hammer mass to extend outside the housing when rotated in a second direction.

18. The borehole tool of claim 17 wherein the housing includes a third opening that permits the hammer mass to extend outside the housing when rotated between the first and second openings.

19. The borehole tool of claim 11 wherein the mass is approximately 1.5 pounds, the mass is characterized by a radius of curvature of 1.75 inches, the hammer is characterized by an arm length from center of gravity to the first hinge of 2.173 inches and the first and second hinges are at a distance of 1.25 inches from each other.

20. The borehole tool of claim 13 wherein the spring is characterized by a spring constant k of approximately 1347 N/cm, the spring is characterized by a compression distance of approximately 6.096 cm.

* * * * *